United States Patent
Fabregas et al.

(10) Patent No.: US 6,943,327 B2
(45) Date of Patent: Sep. 13, 2005

(54) METHOD FOR THE PROGRESSIVE CONTROL OF HEATING ELEMENTS

(75) Inventors: Antoni Ferre Fabregas, Valls (ES); Alberto Garcia Briz, Valls (ES); Joan Fontanilles Pinas, Valls (ES); Jordi Mestre Gausch, Valls (ES); Rudolf Diemer, Alsheim (DE); Stefan Jost, Valls (ES)

(73) Assignee: Lear Corporation, Southfield, MI (US)

( * ) Notice: Subject to any disclaimer, the term of this patent is extended or adjusted under 35 U.S.C. 154(b) by 206 days.

(21) Appl. No.: 10/708,034

(22) Filed: Feb. 4, 2004

(65) Prior Publication Data

US 2005/0167418 A1 Aug. 4, 2005

(51) Int. Cl.⁷ .................................................. H05B 1/02
(52) U.S. Cl. ....................... 219/494; 219/202; 219/497; 219/492; 219/483; 307/38; 307/10.1
(58) Field of Search .............................. 219/494, 497, 219/499, 501, 505, 483–486, 202–205, 490, 491; 307/117, 10.1, 38–41

(56) References Cited

U.S. PATENT DOCUMENTS

| | | | |
|---|---|---|---|
| 3,768,156 A | 10/1973 | Caird et al. .................... 29/611 |
| 5,894,207 A * | 4/1999 | Goings ........................ 318/478 |
| 6,252,208 B1 | 6/2001 | Topp .......................... 219/497 |
| 6,350,968 B1 * | 2/2002 | Connolly et al. ........... 219/497 |
| 6,373,033 B1 * | 4/2002 | de Waard et al. ........... 219/497 |

* cited by examiner

*Primary Examiner*—Mark Paschall
(74) *Attorney, Agent, or Firm*—Bill C Panagos

(57) ABSTRACT

Disclosed is a method particularly applicable to an automotive vehicle seat, through which the control of heating of heating elements is carried out by an electronic circuit, based on the temperature monitored in the heating elements and using Pulse Width Modulation (PWM). The signals applied to the heating elements are progressively adapted to the condition of the different heating elements at all times and throughout their useful life, by variation of the working cycle of the signal applied to the heating elements in the form of a fixed frequency pulse train, and applying said signal after an initial transient state, during which state a maximum voltage has been applied to the heating elements and has been maintained until reaching a desired percentage of an assigned temperature by each of said heating elements.

17 Claims, 4 Drawing Sheets

METHOD FOR THE PROGRESSIVE CONTROL OF HEATING ELEMENTS

BACKGROUND OF INVENTION

1. Field of the Invention

The present invention relates to a method to control the heating of heating elements, particularly heating elements in a seat of an automotive vehicle. The invention operates in a progressive manner and is adapted to controlling said heating elements' state at all times.

2. Description of the Related Art

U.S. Pat. No. 6,252,208 issued on Jun. 26, 2001 to Topp teaches a method and a circuit for controlling the heating current of a seat heater according to the temperature. The same reference teaches a control system based on varying the control signals applied to the heating element from a fixed table saved in ROM memory, which relates application time values of said signals with temperature values monitored through a temperature sensor arranged in said heater. Additionally, U.S. Pat. No. 6,252,208 does not take into account that the heating elements can be different or, especially, have different physical features throughout their useful life, and that these can be modified, particularly in the case of their application in the seat of an automotive vehicle. Their features and performance can significantly vary according to the weight, position and span of the person using the seat and also according to the surrounding environment.

U.S. Pat. No. 3,768,156 issued on Oct. 30, 1973 to Caird et al teaches a method for manufacturing heating panels based on the use of electric conducting polymers, to form a flexible resistive and electricity-conducting element. A voltage is applied through two electrodes connected to each of said elements with the object of heating the heating panel. This reference, although it indicates that the temperature of the panel could be controlled by including a thermostat, does not teach a method for carrying out said control.

There is still a need for a reliable and practical method for controlling the heating of such heating elements. It is therefore desirable to provide a more reliable method for controlling the temperature of said heating elements. The present invention takes into account the heating elements' possible variations of form, depending on the pressure applied to it and the distribution thereof. The present invention also addresses the variation of the heating elements' resistive and conductive features, including those dependent on external parameters such as the temperature of the area in which the heating element is arranged. The present invention also addresses the fact that different materials can be used and arranged such that they form different structures, thus forming different heating elements which obviously will not react in the same way to the same control signal.

DESCRIPTION OF THE INVENTION

In one aspect of the method of the present invention the at least one heating element is constantly monitored and adjusted by the use of a control signal applied to the at least one heating element, thereby individually controlling each said at least one heating element for each condition constantly over time. This control signal is generated by means of monitoring the progression of the state in which each heating element is in at all times, which is carried out by monitoring the temperature thereof through a temperature sensor arranged for that purpose on each heating element.

According to a further aspect of the present invention, the method for progressively controlling the heating of different heating elements, particularly those applicable to a seat of an automotive vehicle, is of the type in which said control is carried out by means of an electronic circuit utilizing Pulse Width Modulation (PWM), based on the temperature monitored in said heating element. Said method is characterized in that the signals to be applied to the heating element are constantly adapted to the current conditions of each individual heating element, throughout the life thereof. This adaptation being obtained by the variation of the working cycle of a voltage signal applied to individually to each heating element in the form of a fixed frequency pulse train, and applying said signal after an initial transient state during which a maximum voltage has been applied to each said heating element.

DETAILED DESCRIPTION

Figure 3:
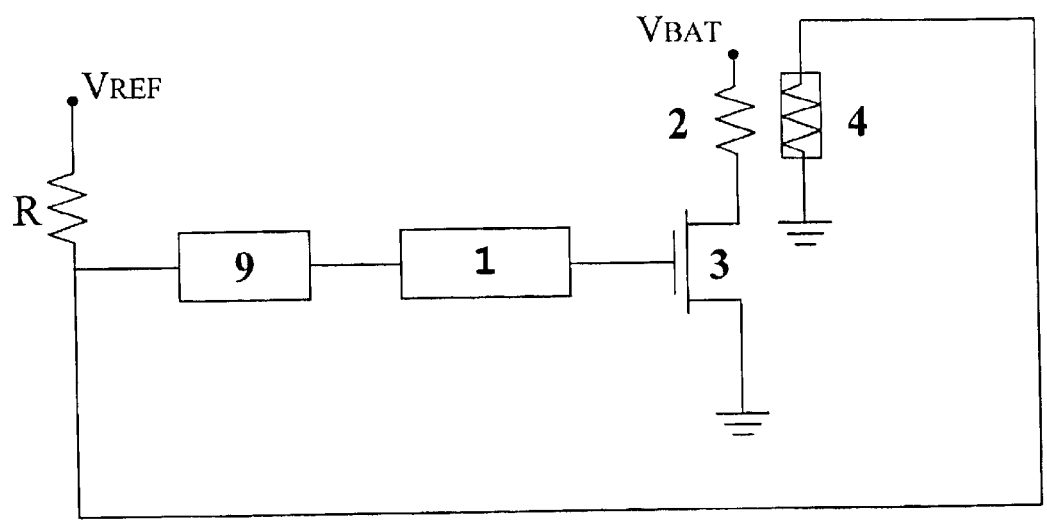
FIG. 3 shows a schematic view of one preferred embodiment of an electronic circuit suitable for use in applying the method of the present invention.
Figure 4:
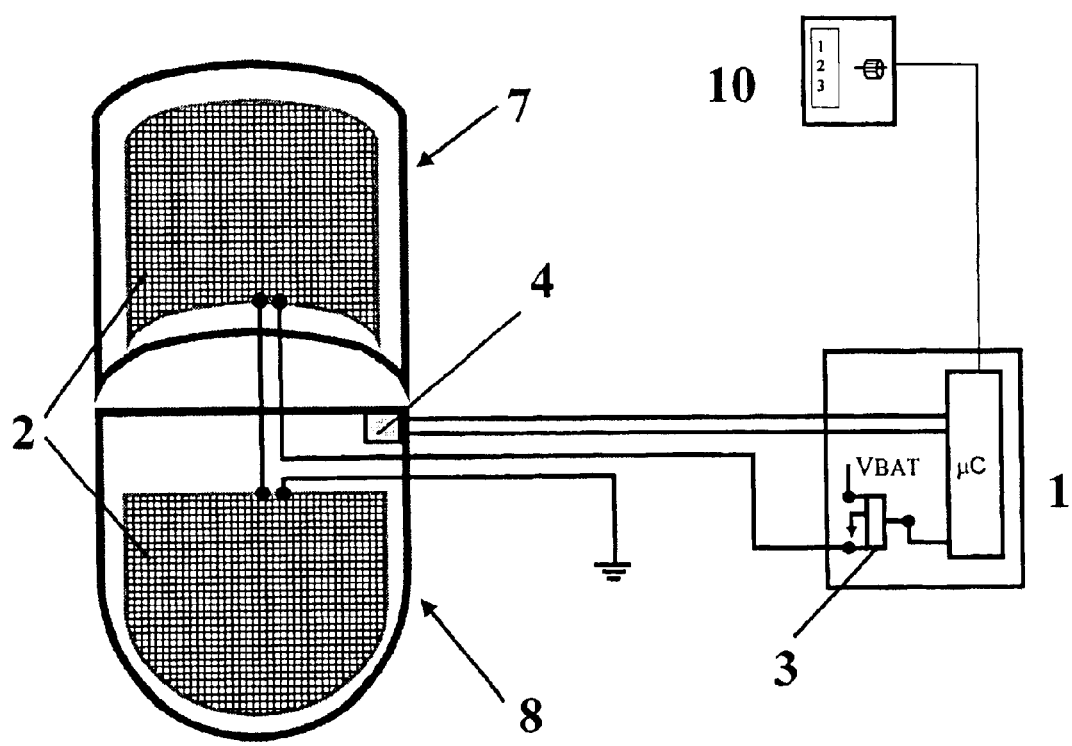
FIG. 4 shows a schematic view of another preferred embodiment of an apparatus suitable for applying the method of the present invention.

The method for progressively controlling the heating of different heating elements, particularly applicable to a seat 8 (FIG. 4) in an automotive vehicle, utilizes a control circuit 1 (FIGS. 3 and 4), said heating being controlled by a temperature-dependent heating current applied to at least one heating elements 2 (FIGS. 3 and 4) by means of Pulse Width Modulation (PWM), said temperature being monitored by means of, at least, one temperature sensor 4 (FIGS. 3 and 4) associated to said heating at least one said element 2 (FIGS. 3 and 4). In one preferred embodiment, the at least one heating element 2 (FIG. 4) is formed by a mesh heating element or MAT. Said method of the present invention comprises progressively adapting a voltage signal to be applied to the at least one heating element 2 (FIGS. 3 and 4) to the physical attributes of each of said at least one heating element 2 (FIGS. 3 and 4) and monitoring said at least one heating element's 2 (FIGS. 3 and 4) individual responses to the immediate surrounding environment, at all times throughout the life thereof. The method of the present invention comprises: (a) an initial transient state 5 (FIG. 1), during which state a maximum voltage is applied to the at least one heating element 2 (FIGS. 3 and 4), and it is maintained until the at least one heating element 2 (FIGS. 3 and 4) reaches a desired percentage, such as 90%, of an assigned temperature previously chosen from among a series of preset values and stored in a ROM memory (not shown); (b) a permanent state 6 (FIG. 1), during which a voltage is applied to the at least one heating element 2 in the form of a fixed frequency pulse train and variable working cycle. Based on several control parameters, the variation of said working cycle will be precisely determined to provide the desired temperature in the at least one heating element 2 (FIGS. 3 and 4). This is achieved by monitoring the temperature in the at least one heating element 2 (FIGS. 3 and 4) by means of a temperature sensor 4 (FIGS. 3 and 4), such as for example, an NTC resistance arranged in a shunt bridge structure.

For a maximum applied voltage, different sets of monitored temperature values in the at least one heating element 2 (FIGS. 3 and 4) are obtained during said transient state 5 (FIG. 1), i.e. before the at least one heating element 2 (FIGS. 3 and 4) reaches the desired percentage of said assigned temperature, such as for example 90%. These values are used for calculating said control parameters using the equation:

$$T = T_f \times (1 - e^{-t/\tau})$$

wherein is the monitored temperature; Tf is said assigned temperature, selectable from among at least two preset values.

By using this equation and the measured values, the parameter T will be accurately determined.

Once said percentage of the assigned temperature Tf has been reached, the permanent state 6 (FIG. 1) will begin, during which state the temperature T of each of the at least one heating element 2 (FIGS. 3 and 4) will continue to be monitored periodically, and from each set of values formed by T, Tf and T, a corresponding value of a certain working cycle of said voltage signal to be applied to the at least one heating element 2 (FIGS. 3 and 4) will be obtained, all these values forming a table, which can be called a dynamic table, while the working cycle of the pulse train of the control signal varies progressively.

Figure 1:
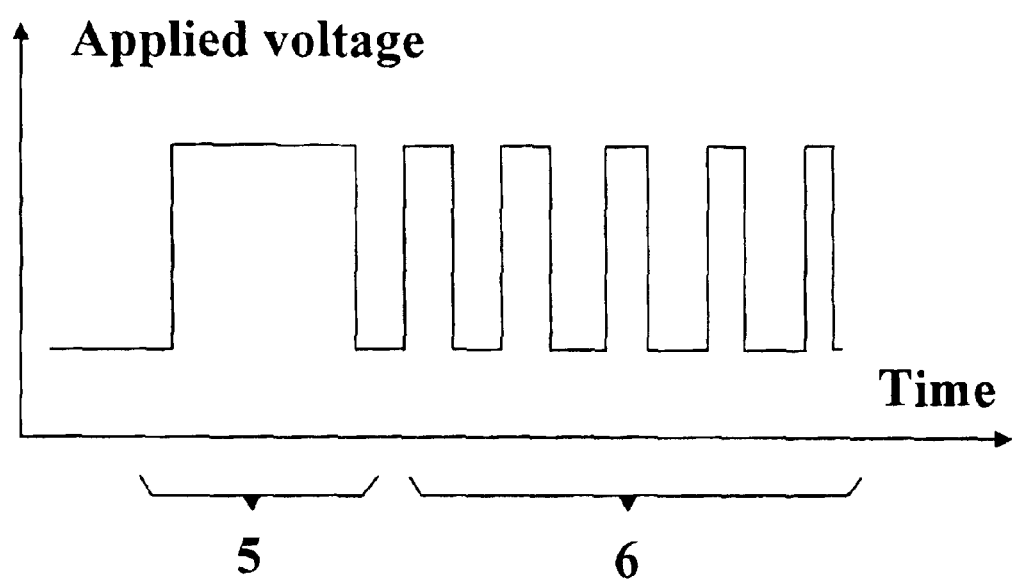
FIG. 1 shows a graphic representation of the signal to be applied to the heating element, in the form of voltage over time, by the method of the present invention.
Figure 2:
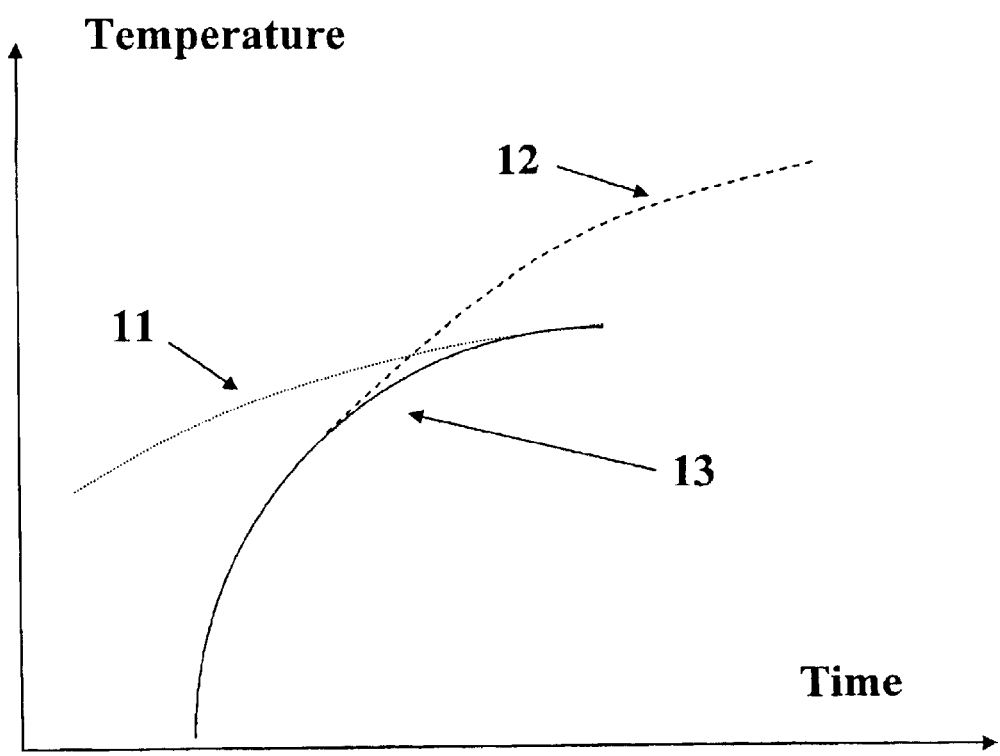
FIG. 2 shows a graphic representation of the progression of the temperature in a heating element due to different control signals.

The advantages of the combination of said transient and permanent states can be seen in FIG. 2. In said FIG. 2, the curve 11 represents the progression of the temperature of the heating elements 2 (FIGS. 3 and 4) over time, when the generated signal, to be applied during the permanent state 6, has been applied to said heating elements 2 (FIGS. 3 and 4) based on the method of the present invention from a beginning, ignoring the transient state 5. The curve 12 also represents the progression of the temperature over time when the maximum voltage is being applied constantly to the heating elements 2 (FIGS. 3 and 4). Finally, curve 13 shows how the temperature progresses over time in the heating elements 2 (FIGS. 3 and 4) when the present method is applied in its entirety, i.e. the maximum voltage during the transient state 5 (FIG. 1), and the fixed frequency pulse train and variable working cycle during the permanent state 6 (FIG. 1). With this, the advantages of curves 11 and 12 are combined, in the form of a rapid increase of the temperature at the beginning, as in curve 12, and greater stability, control and limitation of the temperature, as in curve 11, once the desired percentage of said assigned temperature Tf is reached.

An embodiment of an electronic circuit representative of a typical apparatus for use with the present invention is shown in FIG. 3. In said FIG. 3, the temperature sensor 4 is an NTC resistance which, together with a resistance R connected to a reference voltage $V_{REF}$, forms a voltage divider whose intermediate point is connected to an analog/digital converter 9 that transforms the variations in the form of voltage drop, said variations occurring in the NTC resistance as a response to the temperature variations therein, into digital data which are sent to said control circuit 1, which is responsible for analyzing and processing said data and, based on the data, applying a control signal in pulse train form, to a transistor 3 connected in tandem with the heating element 2, which in turn is fed, through its other end, at a voltage $V_{BAT}$ coming from a battery arranged inside of said automotive vehicle, allowing voltage to heat said element 2 when the transistor 3 is activated.

Another preferred embodiment of the method of the present invention is shown in FIG. 4, comprising arranging at least two heating elements 2, one of them arranged in a backrest 7 of an automotive vehicle and the other one in a seat 8 of the automotive vehicle, with a tandem electrical connection connecting a free end of one heating element 2 in said backrest 7, to a normally open contact of a solid state relay, or to the source of a transistor 3, such as an FET, forming part of the control circuit 1, and a free end of the other heating element 2 in said seat 8, to ground. FIG. 4 also shows how a temperature selector 10, connected to the control circuit 1, may be included for selecting the assigned temperature Tf.

It will be appreciated that there are a great number of other possible applications besides those illustrated herein, depending, for example, on where the heating elements 2 are arranged. Thus the present invention is also suitable for example, with heating elements located in a portion of an automotive vehicle, such as a panel, dashboard or armrest; arranged in a part of an interior of a building; incorporated in a piece of furniture; incorporated in an electric blanket or cushion; and incorporated in an outerwear garment.

Although the preferred embodiments of the present invention has been disclosed, various changes and modifications may be made without departing from the scope of the invention as set forth in the appended claims.

What is claimed is:

1. A method for continuously controlling the heating of heating elements, particularly heating elements in an automotive vehicle seat comprising: providing a control circuit for providing an electrical current to at least one heating element using Pulse Width Modulation (PWM) adapted to receive signals from at least one temperature sensor, each of at least one temperature sensor substantially constantly monitoring at least one heating element temperature; providing a heating current to each of said at least one heating element, the heating current voltage being controlled by Pulse Width Modulation (PWM) by said control circuit; substantially constantly adapting a voltage signal applied to each of said at least one heating elements in an initial transient state during which a maximum voltage is applied to each of said at least one heating elements until said at least one heating elements have reached a desired percentage of a desired temperature, and then in a permanent state during which said voltage signal is applied in the form of a fixed frequency pulse train and variable working cycle characterized in that said voltage applied to said at least one heating element is modified by the physical features of each of said at least one heating elements and the surrounding environment of said at least one heating elements substantially constantly throughout the life of said at least one heating element.

2. A method according to claim 1 wherein, the said constantly adapting of said voltage signal applied during said permanent state is achieved using in-line monitoring of the temperature of each of said at least one heating element through said at least one temperature sensor.

3. A method according to claim 2, wherein a plurality of temperature values obtained from said in-line monitoring are utilized to determine a voltage signal working cycle parameter T using the equation: (Equation A here) wherein: T is the monitored temperature, and Tf is the desired temperature selectable from among at least two preset values.

4. A method according to claim 3, wherein each set of values of, temperature T, assigned temperature Tf, and said voltage signal working cycle parameter T, is stored by said control circuit and provides a dynamic table to provide a continually updated working cycle for said fixed frequency pulse train voltage signal.

5. A method according to claim 1, wherein said desired percentage of said desired temperature Tf is approximately about 90%.

6. A method according to claim 1, wherein at least one heating element comprises at least one heating element located in a backrest of an automotive vehicle, and at least one heating element located in a corresponding seat of said automotive vehicle.

7. A method according to claim 6, wherein said heating elements each comprise a mesh heating elements (MAT).

8. A method according to claim 6, wherein said heating elements are connected in series.

9. A method according to claim 8, wherein the free contact of the heating element located in said backrest is connected to a normally open contact of a Solid State Relay forming part of said control circuit, and the free contact of the heating element located in said seat is connected to ground.

10. A method according to claim 9, wherein said Solid State Relay comprises a power transistor and said normally open contact is the source of said transistor.

11. A method according to claim 1, wherein said at least one temperature sensor comprises at least one NTC resistance.

12. A method according to claim 1, wherein said at least one heating element is positioned in a automotive vehicle interior component, such as for example, a panel, dashboard and an armrest.

13. A method according to claim 1, wherein said at least one heating element is positioned in an interior of a building.

14. A method according to claim 1, wherein said at least one heating element is positioned in a piece of furniture.

15. A method according to claim 1, wherein said at least one heating element is positioned in an electric blanket.

16. A method according to claim 1, wherein said at least one heating element is positioned in a cushion.

17. A method according to claim 1, wherein said at least one heating element is positioned in an outerwear garment.

* * * * *